US010247546B2

(12) United States Patent
Matsuda et al.

(10) Patent No.: US 10,247,546 B2
(45) Date of Patent: Apr. 2, 2019

(54) IMAGE PROCESSING SYSTEM AND METHOD FOR DETECTING A TARGET OBJECT AREA BASED ON HEIGHT INFORMATION

(71) Applicant: PFU LIMITED, Kahoku-shi, Ishikawa (JP)

(72) Inventors: Yuki Matsuda, Kahoku (JP); Mitsuru Nishikawa, Kahoku (JP); Masaya Takamori, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 15/580,918

(22) PCT Filed: Jun. 10, 2015

(86) PCT No.: PCT/JP2015/066778
§ 371 (c)(1),
(2) Date: Dec. 8, 2017

(87) PCT Pub. No.: WO2016/199253
PCT Pub. Date: Dec. 15, 2016

(65) Prior Publication Data
US 2018/0328724 A1      Nov. 15, 2018

(51) Int. Cl.
*G01B 11/25* (2006.01)
*G06T 7/13* (2017.01)
(Continued)

(52) U.S. Cl.
CPC ............... *G01B 11/25* (2013.01); *G06T 7/00* (2013.01); *G06T 7/13* (2017.01); *G06T 7/62* (2017.01);
(Continued)

(58) Field of Classification Search
CPC .............. B25J 9/1612; B25J 9/1697; G05B 2219/40431; G05B 2219/40609;
(Continued)

(56) References Cited

U.S. PATENT DOCUMENTS

2002/0113946 A1    8/2002  Kitaguchi et al.
2010/0081072 A1*   4/2010  Iosad .................. G03F 7/70291
                                                    430/30
(Continued)

FOREIGN PATENT DOCUMENTS

EP    2 161 695 A1    2/2010
JP    10-54709 A      2/1998
(Continued)

OTHER PUBLICATIONS

Japanese Office Action dated Jun. 19, 2018 regarding Japanese Patent Application No. 2017-523033, which is a counterpart of U.S. Appl. No. 15/580,918 (4 pages) with English Translation (3 pages).
(Continued)

*Primary Examiner* — Sang H Nguyen
(74) *Attorney, Agent, or Firm* — Lewis Roca Rothgerber Christie LLP

(57) ABSTRACT

An image processing system, an imager, an area detection method, and a computer program easily and highly accurately detecting an area where a target object exists in an image acquired by imaging the target object are provided. The image processing system includes a projector for projecting a projection image having a stripe pattern or a grid pattern toward a target object, and an imager for imaging a target object on which the projection image is projected, and the imager includes an input image obtaining module for obtaining an input image acquired by imaging a target object on which the projection image is projected, a height information calculator for calculating height information of each
(Continued)

pixel in the input image by using the input image, and a target object area detector for detecting a target object area where the target object exists in the input image, based on the height information of each pixel in the input image.

8 Claims, 15 Drawing Sheets

(51) Int. Cl.
| | | |
|---|---|---|
| H04N 1/107 | (2006.01) | |
| H04N 5/222 | (2006.01) | |
| G06T 7/62 | (2017.01) | |
| G06T 7/00 | (2017.01) | |
| H04N 1/10 | (2006.01) | |

(52) U.S. Cl.
CPC ............... *H04N 1/10* (2013.01); *H04N 1/107* (2013.01); *H04N 5/222* (2013.01); *G06T 2207/10024* (2013.01)

(58) Field of Classification Search
CPC .......... G05B 2219/39508; G05B 2219/40032; G06K 9/00664
See application file for complete search history.

(56) References Cited

U.S. PATENT DOCUMENTS

| | | | | |
|---|---|---|---|---|
| 2010/0195114 A1* | 8/2010 | Mitsumoto | .......... | G01B 11/245 356/601 |
| 2011/0134225 A1* | 6/2011 | Saint-Pierre | .......... | G01B 11/03 348/47 |
| 2012/0316820 A1* | 12/2012 | Nakazato | ............... | G01B 11/25 702/94 |
| 2013/0182106 A1 | 7/2013 | Nakamichi et al. | | |
| 2013/0272581 A1* | 10/2013 | Moden | .................. | G06T 7/0042 382/106 |
| 2013/0329942 A1* | 12/2013 | Sonoda | .............. | G01B 11/2513 382/103 |
| 2015/0070472 A1* | 3/2015 | Chen | .................. | G01B 11/2531 348/47 |
| 2015/0260510 A1* | 9/2015 | Nakajima | .......... | G01B 11/2513 348/136 |
| 2017/0030706 A1* | 2/2017 | Natori | ..................... | G06T 7/001 |
| 2017/0122727 A1* | 5/2017 | Bismuth | .................. | A41H 1/02 |

FOREIGN PATENT DOCUMENTS

| | | |
|---|---|---|
| JP | 2003-78725 A | 3/2003 |
| JP | 2013-145441 A | 7/2013 |
| WO | WO 2008/149923 A1 | 12/2008 |

OTHER PUBLICATIONS

International Search Report for International Application No. PCT/JP2015/066778, dated Aug. 25, 2015 (3 pages) with English Translation (1 page).

Written Opinion for International Application No. PCT/JP2015/066778, dated Aug. 25, 2015 (4 pages) with English Translation (6 pages).

International Preliminary Report on Patentability for International Application No. PCT/JP2015/066778 dated Dec. 12, 2017 (1 page).

* cited by examiner

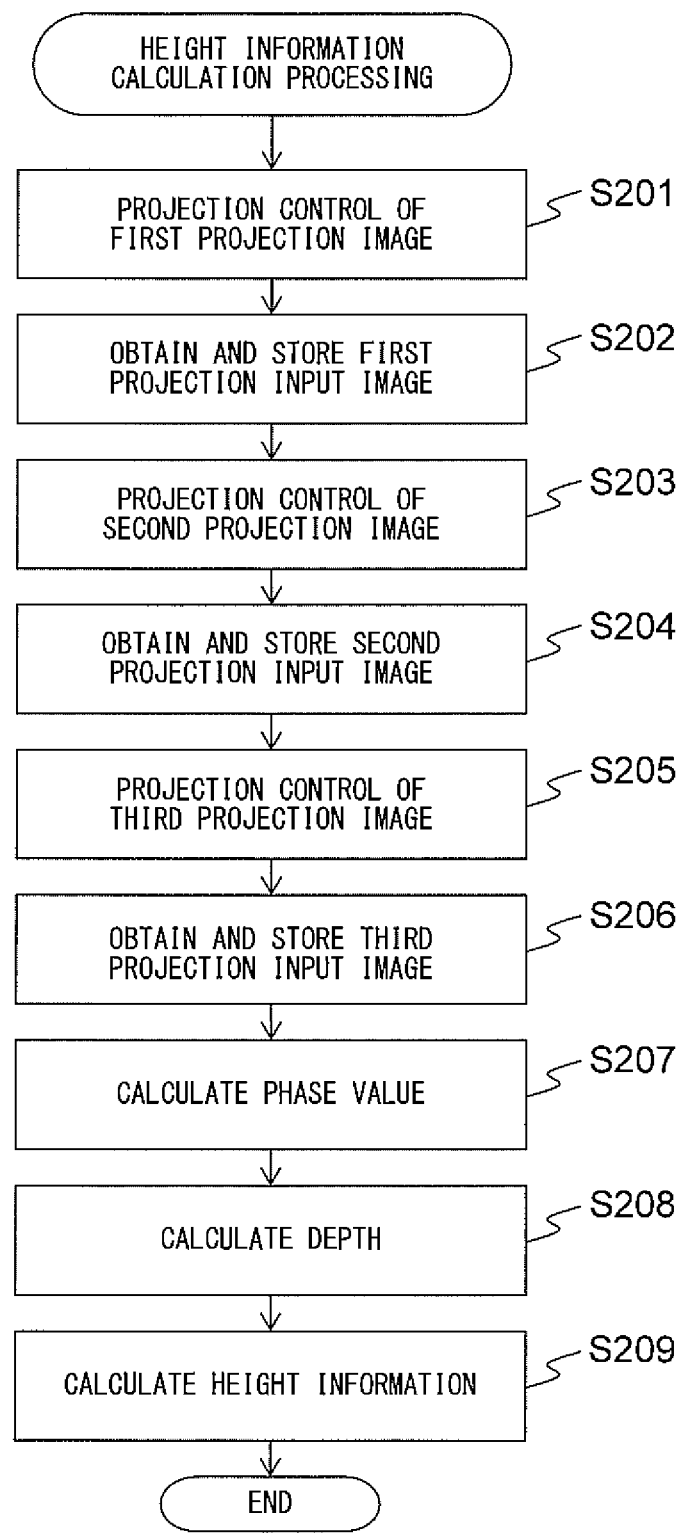

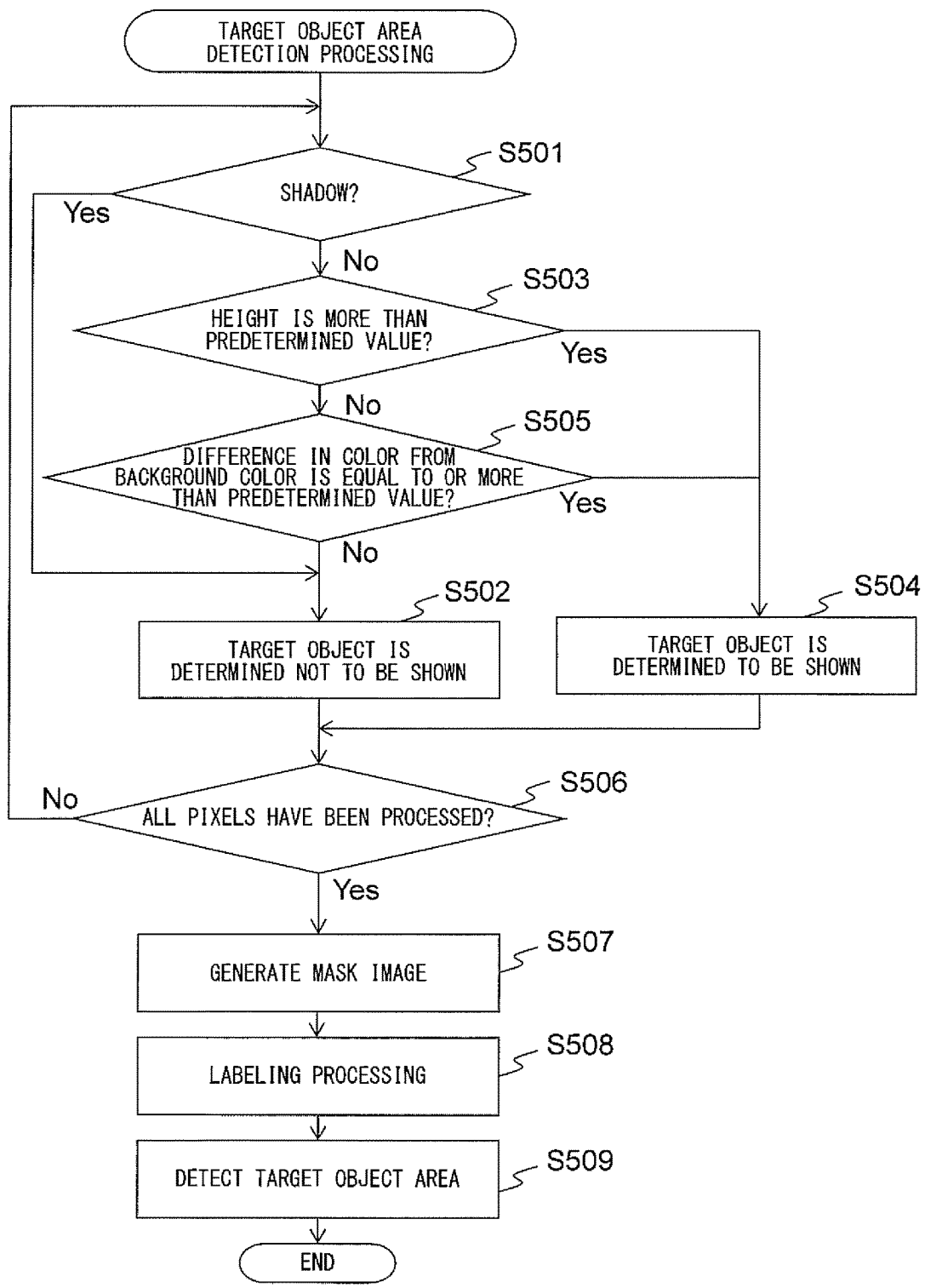

IMAGE PROCESSING SYSTEM AND METHOD FOR DETECTING A TARGET OBJECT AREA BASED ON HEIGHT INFORMATION

CROSS-REFERENCE TO RELATED APPLICATION(S)

This application is a National Phase Patent Application and claims priority to and the benefit of International Application Number PCT/JP2015/066778, filed on Jun. 10, 2015, the entire disclosure of which is incorporated herein by reference.

TECHNICAL FIELD

The present disclosure relates to an image processing system, an imager, an area detection method, and a computer program, and more particularly, the present disclosure relates to an image processing system, an imager, an area detection method, and a computer program for detecting an area where a target object exists from an input image.

BACKGROUND

In recent years, when a product having a three-dimensional shape is offered for sale on an electronic commerce (EC) site, an auction site, etc., a three-dimensional image is posted as a product image, so that viewers of the site can easily understand the shape of the product. The seller of the product can create a three-dimensional image of the product, for example, by using a projector that projects a predetermined projection image and a camera that captures the image of the product on which the projected image is projected.

An image input apparatus that causes a light projecting module to emit a predetermined light projection pattern on a subject and causes an imaging module to capture a projected image having a distortion of the projected pattern. In this image input apparatus, the relative position between the light projection module and the imaging module is fixed, and the moving module relatively moves the imaging module and accordingly the imaging module captures images of multiple light projection images at different imaging positions is disclosed (see Patent Literature 1).

An object identification apparatus, which captures an image of a bread and a tray while backlight is emitted from the back of the tray carrying the bread, crops the bread area from the captured color digital image, and identifies the type of the bread based on the cropped bread area is disclosed (see Patent Literature 2).

CITATION LIST

Patent Literature

Patent Literature 1: Japanese Unexamined Patent Publication (Kokai) No. 2003-78725
Patent Literature 2: Japanese Unexamined Patent Publication (Kokai) No 2013-145441

SUMMARY

Technical Problem

When a three-dimensional image of the target object is generated from an image acquired by imaging the target object, it is preferred to easily and highly accurately detect the area where the target object exists.

It is an object of the image processing system, the imager, the area detection method, and the computer program to easily and highly accurately detect the area where the target object exists in the image acquired by imaging the target object.

Solution Problem

The image processing system according to an embodiment includes a projector for projecting a projection image having a stripe pattern or a grid pattern toward a target object, and an imager for imaging a target object on which the projection image is projected, the imager includes an input image obtaining module for obtaining an input image acquired by imaging the target object on which the projection image is projected, a height information calculator for calculating height information of each pixel in the input image by using the input image, and a target object area detector for detecting a target object area where the target object exists in the input image, based on the height information of each pixel in the input image.

The imager according to an embodiment includes an input image obtaining module for obtaining an input image acquired by imaging a target object on which a projection image having a stripe pattern or a grid pattern is projected by a projector, and a height information calculator for calculating height information of each pixel in the input image by using the input image, and a target object area detector for detecting a target object area where the target object exists in the input image, based on the height information of each pixel in the input image.

The area detection method according to an embodiment is an area detection method for an image processing system including a projector and an imager, the area detection method includes projecting, by the projector, a projection image having a stripe pattern or a grid pattern toward a target object, obtaining, by the imager, an input image acquired by imaging the target object on which the projection image is projected, calculating, by the imager, height information of each pixel in the input image by using the input image, detecting, by the imager, a target object area where the target object exists in the input image, based on the height information of each pixel in the input image.

The computer program according to an embodiment causes a computer to execute obtaining an input image acquired by imaging a target object on which a projection image having a stripe pattern or a grid pattern is projected by a projector, calculating height information of each pixel in the input image by using the input image, and detecting a target object area where the target object exists in the input image, based on the height information of each pixel in the input image.

Advantageous Effects of Invention

According to the present embodiment, the image processing system, the imager, the area detection method, and the computer program can easily and highly accurately detect the area where the target object exists in the image acquired by imaging the target object.

The object and advantages of the invention will be realized and attained by means of the elements and combinations, in particular, pointed out in the claims. It is to be understood that both the foregoing general description and the following detailed description are exemplary and explanatory, and are not restrictive of the invention, as claimed.

BRIEF DESCRIPTION OF DRAWINGS

FIG. 6 is a flowchart illustrating an example of operation of height information calculation processing.

FIG. 13 is a flowchart illustrating an example of operation of target object area detection processing.

DESCRIPTION OF THE EMBODIMENTS

Hereinafter, an image processing system, an imager, an area detection method, and a computer program according to an embodiment, will be described with reference to the drawings. However, note that the technical scope of the invention is not limited to these embodiments and extends to the inventions described in the claims and their equivalents.

Figure 1A:
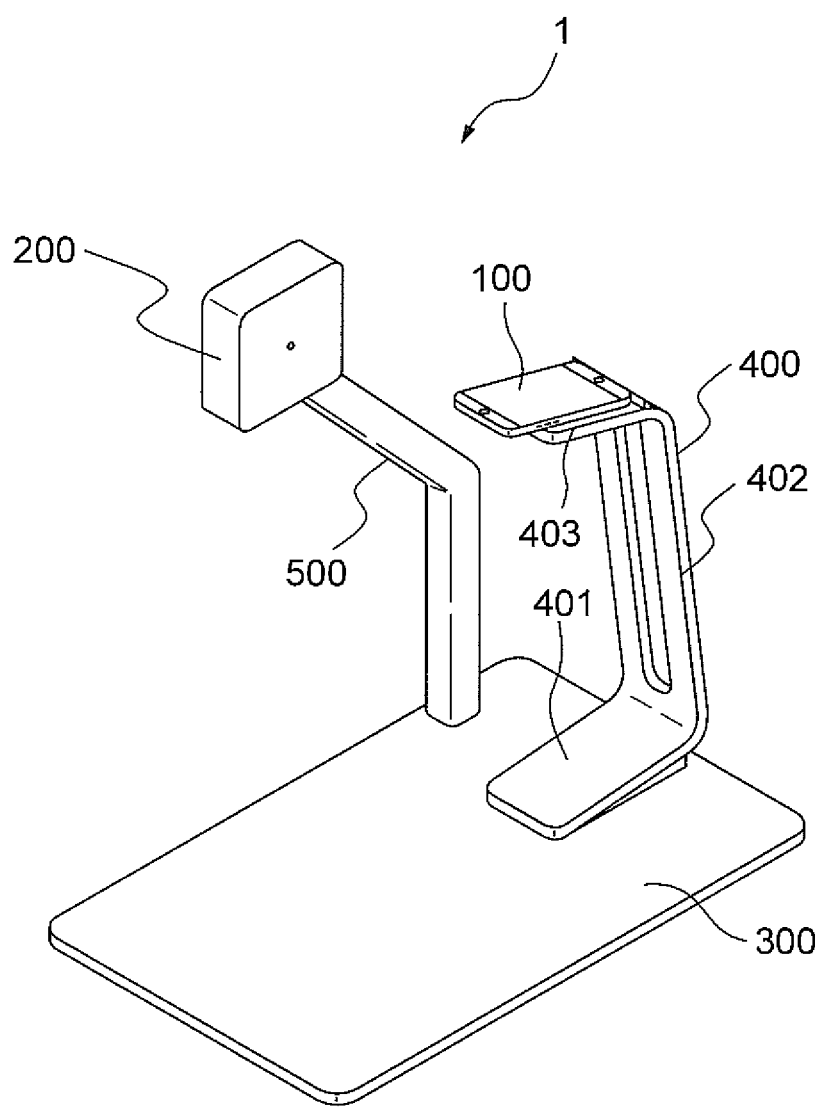
FIG. 1A is a diagram illustrating a schematic configuration of an image processing system 1 according to an embodiment.
Figure 1B:
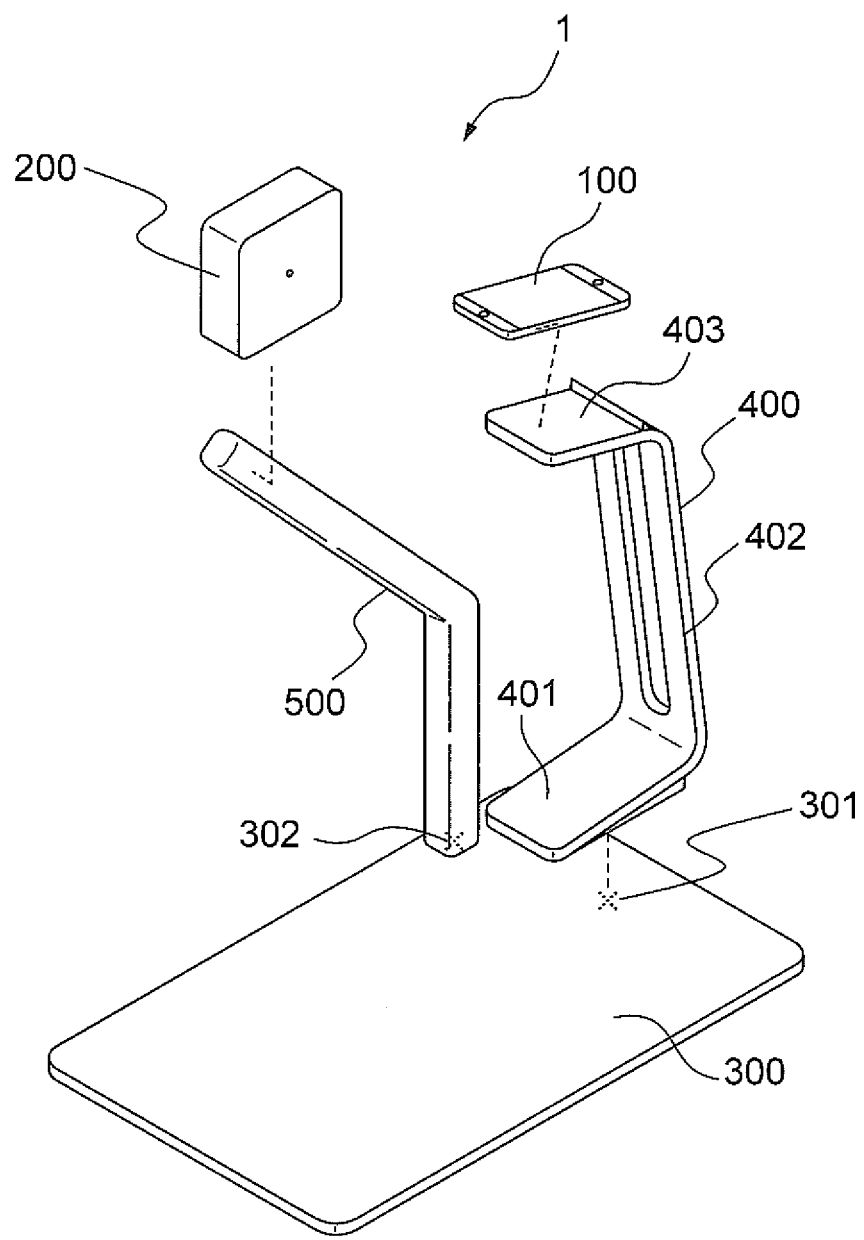
FIG. 1B is an exploded view illustrating the image processing system 1 according to the embodiment.

FIG. 1A is a diagram illustrating a schematic configuration of an image processing system according to an embodiment. FIG. 1B is an exploded view illustrating the image processing system. As illustrated in FIGS. 1A, 1B, the image processing system 1 includes an imager (image reading apparatus) 100, a projector (image projection apparatus) 200, a platen table 300, an installation stand 400, and a support member 500, etc.

The imager 100 is an apparatus that is disposed above a target object placed on the platen table 300 and that captures an image of the target object. The imager 100 is, for example, a multifunctional mobile phone (a smartphone), a tablet personal computer (PC), a portable information terminal, etc., having a camera, etc. The target object imaged by the imager 100 is, for example, an object having a stereoscopic three-dimensional shape.

The projector 200 is an apparatus that is disposed above the target object placed on the platen table 300 and projects a projection image toward a target object. For example, the projector 200 is a projector.

The platen table 300 is a table on which the target object to be imaged by the imager 100 is placed.

The installation stand 400 is a stand on which the imager 100 is installed. The installation stand 400 has a U-shape including a base 401, a connection member 402, and an installation member 403. The base 401 has a planar shape and is attached to a predetermined position 301 of the platen table 300 with screws, etc. The base 401 may not be attached to the determined position 301 but may simply be placed thereon. The connection member 402 has a planar shape and extends upward in the vertical direction from the base 401. The installation member 403 has a planar shape, and is attached to the vertically upper end of the connection member 402 in the same direction as the base 401 is attached. The imager 100 is placed on the installation member 403 so that the target object placed on the platen table 300 can be imaged, i.e., the imaging direction is vertically downward and the installation member 403 is not included in the imaging range.

The support member 500 is a member that supports the projector 200. The support member 500 has an L shape and is attached to the predetermined position 302 of the platen table 300 with screws, etc., and the support member 500 extends upward in the vertical direction from the platen table 300. The projector 200 is attached to the end of the support member 500 at the side opposite to the end attached to the platen table 300 with screws etc. The projector 200 is attached to the support member 500 so that the projection image can be projected on the target object placed on the platen table 300, i.e., the projection direction is vertically downward.

As illustrated in FIG. 1A and FIG. 1B, the installation stand 400 and support member 500 are arranged at predetermined positions 301 and 302, respectively, of the platen table 300, so that the arrangement position of the imager 100, the projector 200, and the platen table 300 are fixed. As a result, the position relation is maintained to be constant between the optical center and imaging direction of the imaging apparatus of the imager 100, the optical center and projection direction of the projector 200, and the placing plane of the platen table 300.

The support member 500 may be attached to the installation stand 400 rather than being attached to the platen table 300. The imager 100 and the installation stand 400 may be integrally configured using, for example, an overhead scanner apparatus, etc.

Figure 2:
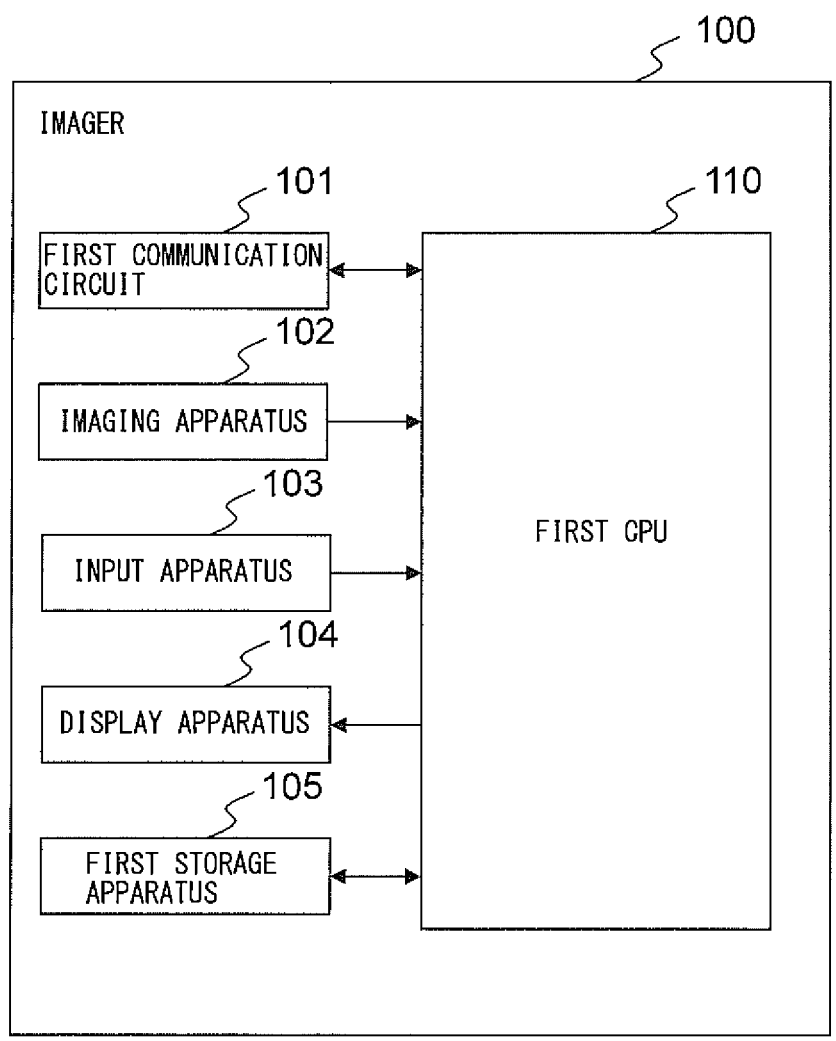
FIG. 2 is a hardware configuration diagram illustrating an imager 100.

FIG. 2 is a hardware configuration diagram illustrating the imager 100. As illustrated in FIG. 2, the imager 100 includes a first communication circuit 101, an imaging apparatus 102, an input apparatus 103, a display apparatus 104, a first storage apparatus 105, a first central processing unit (CPU) 110, etc. Each module of the imager 100 will be described details below.

The first communication circuit 101 includes an antenna for transmitting and receiving radio signals and a wireless communication interface circuit for transmitting and receiving a signal through a wireless communication circuit according to a predetermined communication protocol such as a wireless local area network (LAN). The first communication circuit 101 communicates with the projector 200 through an access point (not illustrated), transmits the information output from the first CPU 110 to the projector 200, and transmits the information received from the projector 200 to the first CPU 110. It should be noted that the first communication circuit 101 may directly communicate with the projector 200 without relying on the access points. In addition, the first communication circuit 101 may communicate with the projector 200 with short-range wireless communication.

The imaging apparatus 102 has an imaging sensor for imaging the target object. This imaging sensor includes an imaging device and an optical system for forming the image of the target object on the imaging device. Each imaging device outputs analog values corresponding to RGB colors. The imaging device is a charge coupled device (CCD), a complementary metal oxide semiconductor (CMOS), etc., arranged in one or arranged two dimensionally. The imaging apparatus 102 converts each analog value output from the imaging sensor into a digital value to generate pixel data, and generates image data (hereinafter referred to as input image) composed of each generated pixel data. In this input image, for example, each pixel data is color image data composed of a total of 24 bits of RGB values represented with 8 bits for each color of RGB. The imaging apparatus 102 outputs the generated input image to the first CPU 110.

The input apparatus 103 has an input device such as a touch pad and an interface circuit for obtaining a signal from the input device, and outputs a signal corresponding to the operation of the user to the first CPU 110.

The display apparatus 104 includes a display composed of liquid crystal, organic electro-luminescence (EL), etc., and an interface circuit that outputs image data to a display, and displays image data output from the first CPU 110.

The first storage apparatus 105 includes a volatile semiconductor memory such as a random access memory (RAM), a nonvolatile semiconductor memory such as a read only memory (ROM), etc. The first storage apparatus 105 stores computer programs, databases, tables, various images, etc., used for various processing of the imager 100. The computer program may be installed on the first storage apparatus 105 from a computer-readable, non-transitory medium such as a compact disk read only memory (CD-ROM), a digital versatile disk read only memory (DVD-ROM), or the like by using a well-known setup program or the like.

The first storage apparatus 105 stores a positional relationship between the optical center of the imaging apparatus 102 and the optical center of the projector 200, a positional relationship between the optical center of the imaging apparatus 102 and the placing plane of platen table 300, etc. For example, a vector going from the optical center of the imaging apparatus 102 to the optical center of the projector 200 is stored as a positional relationship between the optical center of the imaging apparatus 102 and the optical center of the projector 200. The distance from the optical center of the imaging apparatus 102 to the placing plane of the platen table 300, the angle of the imaging direction of the imaging apparatus 102 with respect to the placing plane of the platen table 300, etc., are stored as the positional relationship between the optical center of the imaging apparatus 102 and the placing plane of the platen table 300. These pieces of information are measured in advance at the time of product shipment or installation of the image processing system 1, etc.

The first CPU 110 is connected to the first communication circuit 101, the imaging apparatus 102, the input apparatus 103, the display apparatus 104, and the first storage apparatus 105, and controls these modules. The first CPU 110 performs data transmission and reception control for transmission to and reception from the projector 200 via the first communication circuit 101, image generation control of the imaging apparatus 102, input control of the input apparatus 103, display control of the display apparatus 104, control of the first storage apparatus 105, etc.

Figure 3:
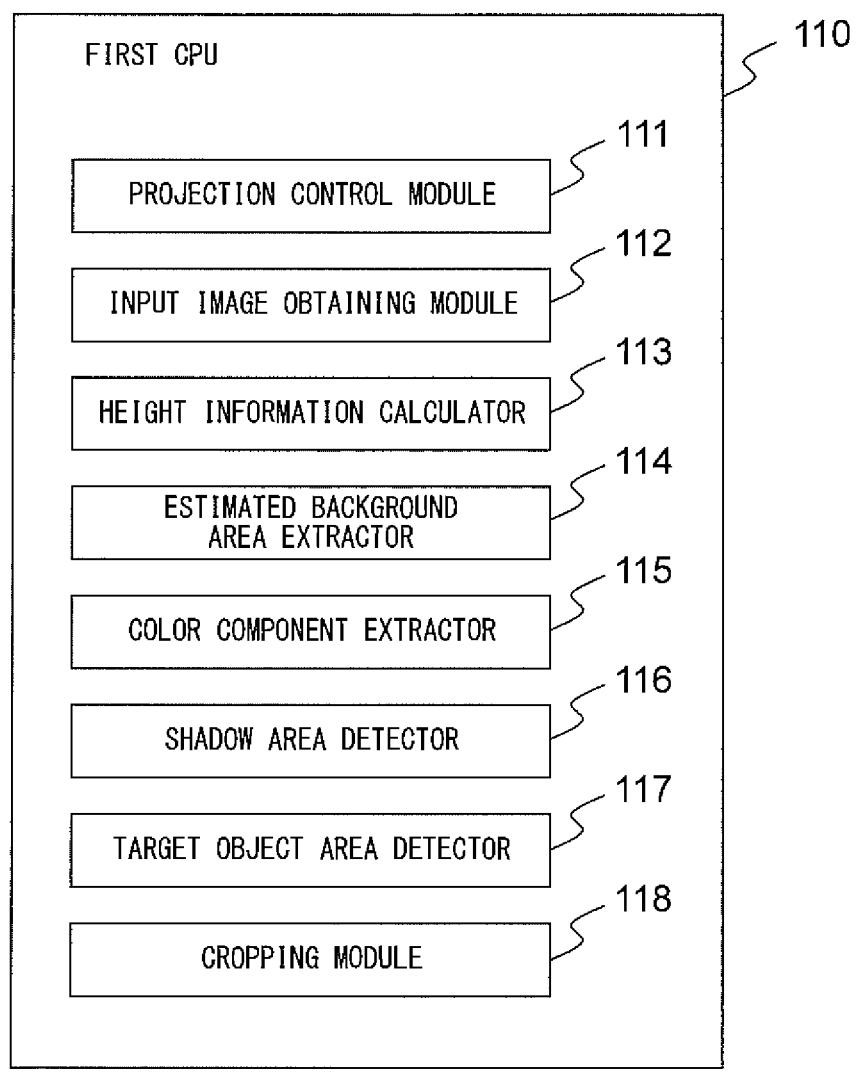
FIG. 3 is a diagram illustrating a schematic configuration of a first CPU 110.

FIG. 3 is a diagram illustrating a schematic configuration of the first CPU 110. As illustrated in FIG. 3, the first CPU 110 includes a projection control module 111, an input image obtaining module 112, a height information calculator 113, an estimated background area extractor 114, a color component extractor 115, a shadow area detector 116, a target object area detector 117, a cropping module 118, etc. Each of these modules is a functional module implemented with software running on a processor. Alternatively or in addition, each of these modules may be composed of integrated circuits, microprocessors, firmware, etc., independent from each other.

Figure 4:
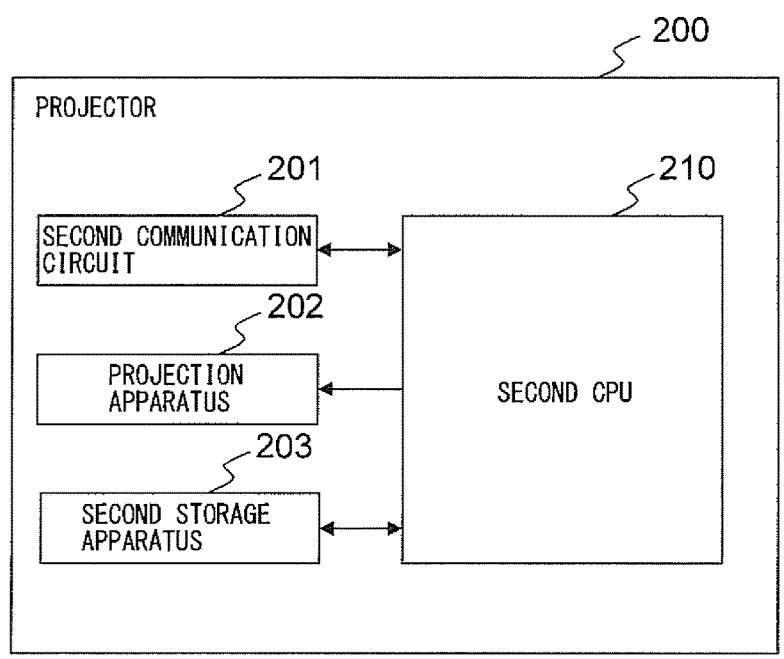
FIG. 4 is a hardware configuration diagram illustrating a projector 200.

FIG. 4 is a hardware configuration diagram illustrating the projector 200. As illustrated in FIG. 4, the projector 200 includes a second communication circuit 201, a projection apparatus 202, a second storage apparatus 203, a second CPU 210, etc. Each module of the projector 200 will be described details below.

The second communication circuit 201 has an interface circuit similar to the first communication circuit 101 of the imager 100. The second communication circuit 201 communicates with the imager 100, transmits information output from the second CPU 210 to the imager 100, and outputs the information received from the imager 100 to the second CPU 210.

The projection apparatus 202 includes a light source, an optical system, etc., and projects the image output from the second CPU 210 toward the target object.

The second storage apparatus 203 includes a volatile semiconductor memory such as a RAM, a nonvolatile semiconductor memory such as a ROM, etc. The second storage apparatus 203 stores computer programs, databases, tables, various images, etc., used for various processing of the projector 200. The computer program may be installed on the second storage apparatus 203 from a computer-readable, non-transitory medium such as a CD-ROM, a DVD-ROM, or the like by using a well-known setup program or the like.

The second CPU 210 is connected to the second communication circuit 201, the projection apparatus 202, and the second storage apparatus 203, and controls these modules. The second CPU 210 performs data transmission and reception control for transmission to and reception from the imager 100 via the second communication circuit 201, image projection control of the projection apparatus 202, control of the second storage apparatus 203, etc.

Figure 5:
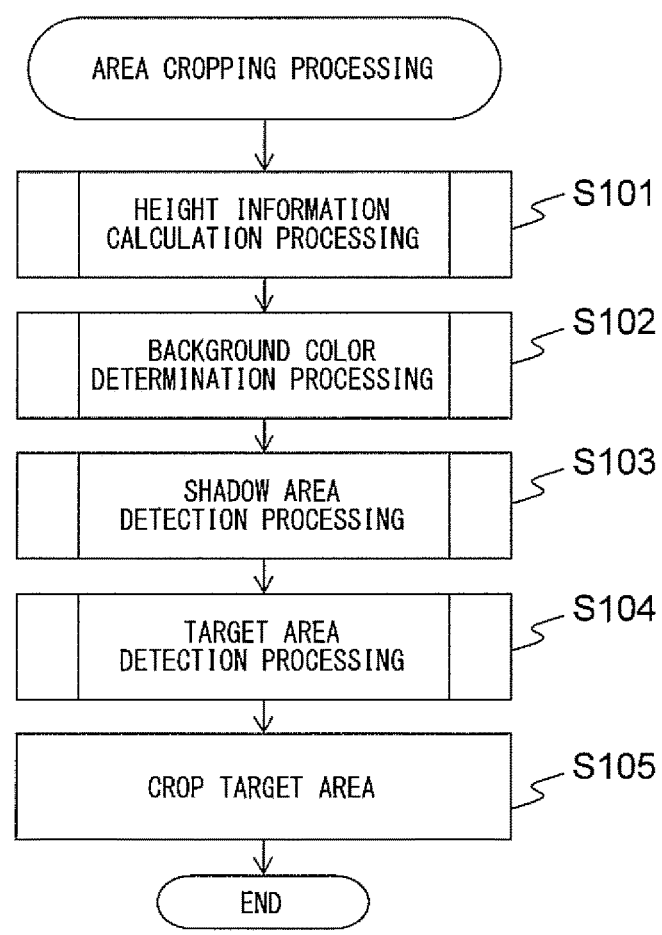
FIG. 5 is a flowchart illustrating operation of area cropping processing.

FIG. 5 is a flowchart illustrating operation of area cropping processing performed by the imager 100. Hereinafter, the operation of area cropping processing will be described with reference to the flowchart illustrated in FIG. 5. The flow of the operation to be described below is executed mainly by the first CPU 110 in cooperation with each element of the imager 100 based on the program stored in the first storage apparatus 105 in advance.

First, the first CPU 110 performs height information calculation processing (step S101). In height information calculation processing, the first CPU 110 calculates the height information of each pixel in an input image (which may be hereinafter referred to as "projection input image") acquired by imaging a target object on which the projection image is projected. The projection input image is an example of an input image. The details of height information calculation processing will be described later.

Subsequently, the first CPU 110 performs background color determination processing (step S102). In the background color determination processing, the first CPU 110 determines the color component of the background in an input image (which may be hereinafter referred to as non-projection input image) acquired by imaging a target object on which no projection image is projected. The non-projection input image is an example of second input image. The details of the background color determination processing will be described later.

Subsequently, the first CPU 110 performs shadow area detection processing (step S103). In the shadow area detection processing, the first CPU 110 detects a shadow area in which a shadow is illustrated in the projection input image and the non-projection input image. The details of shadow area detection processing will be described later.

Subsequently, the first CPU 110 performs the target area detection processing (step S104). In the target area detection processing, the first CPU 110 detects the target object area in which the target object exists in the projection input image and the non-projection input image. The details of the target object area detection processing will be described later.

Subsequently, the first CPU 110 generates a cropping image by cropping the detected target object area from the non-projection input image, stores the detected target object area in the first storage apparatus 105 (step S105), and terminates the series of steps. The user can use the input apparatus 103 to display, on the display apparatus 104, the cropped image stored in the first storage apparatus 105, or the user can use the input apparatus 103 to send the cropped image to another apparatus. It should be noted that the first CPU 110 may convert the cropped image into a three-dimensional image using the height information calculated in the height information calculation processing. In the three-dimensional image, height information is stored in association with the pixel value for each of the pixels arranged in two dimensions, and based on the height information of each pixel, three-dimensional image is stereoscopically displayed on the display apparatus 104. When the three-dimensional image is displayed on the display apparatus 104, the first CPU 110 switches the viewpoint of the displayed three-dimensional image according to an instruction given by the user using the input apparatus 103.

FIG. 6 is a flowchart illustrating an example of operation of height information calculation processing. The flow of the operation illustrated in FIG. 6 is executed in step S101 of the flowchart illustrated in FIG. 5.

The first CPU 110 performs three-dimensional measurement of the target object according to the phase shift method. In order to perform the three-dimensional measurement, the projection control module 111 first transmits a first request signal for requesting to project the first projection image toward the target object to the projector 200 via the first communication circuit 101 (step S201). The first request signal includes a first projection image. The first projection image is an image having a stripe pattern or grid pattern. It should be noted that, in the later-described embodiment, an example using an image having a stripe pattern is illustrated as an example.

Upon receiving the first request signal via the second communication circuit 201, the second CPU 210 of the projector 200 stores the first projection image included in the first request signal in the second storage apparatus 203 and causes the projection apparatus 202 to project the first projection image. It should be noted that the first projection image may be stored in advance in the second storage apparatus 203 of the projector 200 and the first CPU 110 may transmit the first request signal including the identification information of the first projection image instead of the first projection image.

Subsequently, the imaging apparatus 102 generates a first projection input image acquired by imaging the target object on which the first projection image is projected, and outputs the first projection input image to the first CPU 110. The input image obtaining module 112 obtains the first projection input image, and stores the first projection input image in the first storage apparatus 105 (step S202).

Figure 7A:
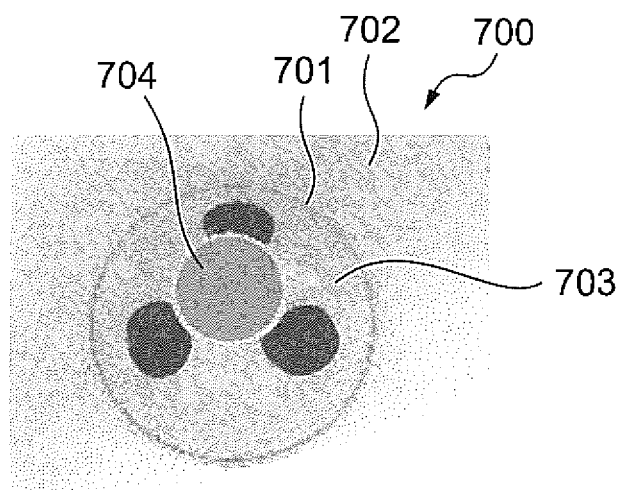
FIG. 7A is a schematic diagram explaining each input image.

FIG. 7A to FIG. 7D are schematic diagrams for explaining input images imaged by the imaging apparatus 102. The image 700 illustrated in FIG. 7A is an example of a non-projection input image. As illustrated in FIG. 7A, the non-projection input image 700 is an image acquired by imaging a tea cup 701 placed on the platen table 300 as a target object. The tea cup 701 has a plain portion 703 having a color similar to that of the background 702 in which the platen table 300 is illustrated and a pattern 704 having a color different from that of the background 702.

Figure 7B:
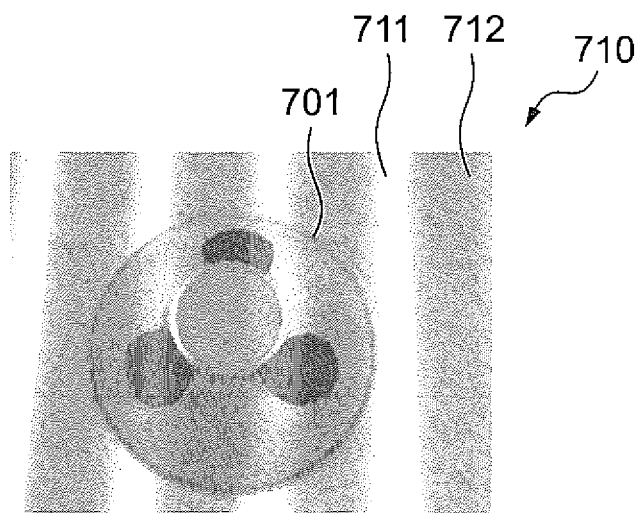
FIG. 7B is a schematic diagram explaining each input image.

The image 710 illustrated in FIG. 7B is an example of a first projection input image. As illustrated in FIG. 7B, the first projection input image 710 is an image acquired by imaging a tea cup 701 on which a predetermined sinusoidal pattern is projected as a first projection image. The sinusoidal pattern has a stripe pattern in which a white portion 711 and a predetermined color portion 712 other than the white portion are periodically repeated. On the platen table 300 having a planar shape, the stripe based on the sinusoidal pattern is a straight line. The stripe based on the sinusoidal pattern is distorted and does not become a straight line on the tea cup 701 having a bulging shape with respect to platen table 300.

Subsequently, the projection control module 111 transmits a second request signal for requesting to project the second projection image toward the target object to the projector 200 via the first communication circuit 101 (step S203). The second request signal includes the second projection image. The second projection image is an image having a stripe pattern or a grid pattern.

Upon receiving the second request signal via the second communication circuit 201, the second CPU 210 of the projector 200 stores the second projection image included in the second request signal into the second storage apparatus 203 and causes the projection apparatus 202 to project the second projection image.

Subsequently, the imaging apparatus 102 generates a second projection input image acquired by imaging the target object on which the second projection image is projected, and outputs the second projection input image to the first CPU 110. The input image obtaining module 112 obtains the second projection input image and stores the second projection input image in the first storage apparatus 105 (step S204).

Figure 7C:
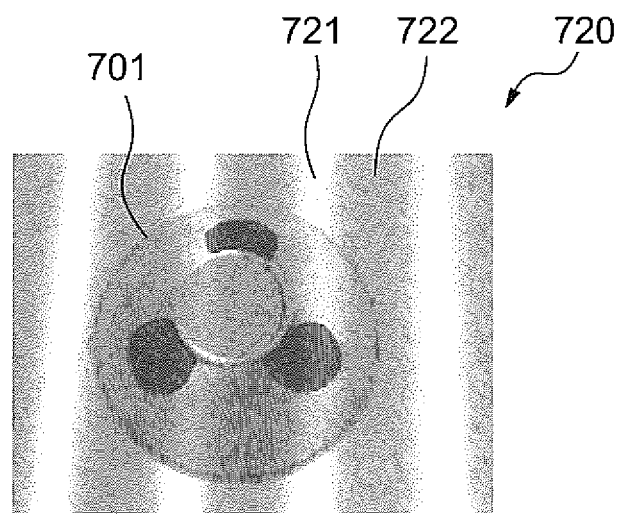
FIG. 7C is a schematic diagram explaining each input image.

The image 720 illustrated in FIG. 7C is an example of a second projection input image. As illustrated in FIG. 7C, the second projection input image 720 is an image acquired by imaging the tea cup 701 on which a sinusoidal pattern acquired by shifting the phase by $\pi/2$ from the sinusoidal pattern of the first projection image is projected as the second projection image. In the second projection input image 720, the white portion 721, and the predetermined color portion 722 are projected to the position where the phase is shifted by $\pi/2$ from the position where the white portion 711 and the predetermined color portion 712 are projected in the first projection input image 710.

Subsequently, the projection control module 111 transmits a third request signal for requesting to project the third projection image toward the target object to the projector 200 via the first communication circuit 101 (step S205). The third request signal includes a third projection image. The third projection image is an image having a stripe pattern or a grid pattern.

Upon receiving the third request signal via the second communication circuit 201, the second CPU 210 of the projector 200 stores the third projection image included in the third request signal in the second storage apparatus 203 and causes the projection apparatus 202 to project the third projection image.

Subsequently, the imaging apparatus 102 generates a third projection input image acquired by imaging the target object on which the third projection image is projected, and outputs the third projection input image to the first CPU 110. The input image obtaining module 112 obtains the third projection input image and stores the third projection input image in the first storage apparatus 105 (step S206).

Figure 7D:
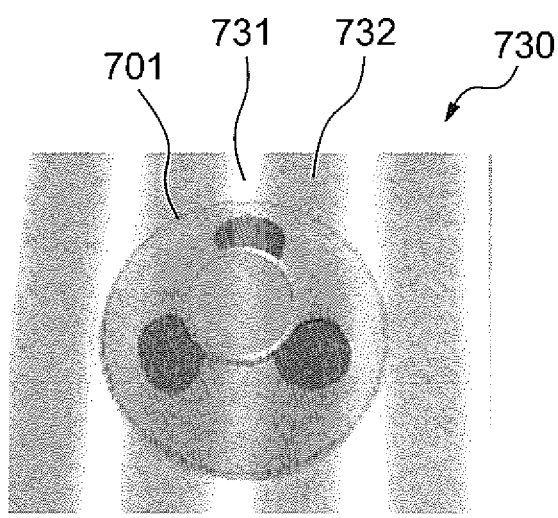
FIG. 7D is a schematic diagram explaining each input image.

The image 730 illustrated in FIG. 7D is an example of a third projection input image. As illustrated in FIG. 7C, the third projection input image 730 is an image acquired by imaging a tea cup 701 on which a sinusoidal pattern acquired by further shifting the phase by $2\pi/3$ from the sinusoidal pattern of the second projection image is projected as the third projection image. In the third projection input image 730, the white portion 731 and the preceding color portion 732 are projected to the position where the phase is shifted by $2\pi/3$ from the position where the white portion 721 and the predetermined color portion 722 are projected in the second projection input image 720.

Subsequently, the height information calculator 113 calculates the phase value of the sinusoidal pattern at the position of each pixel from the luminance value of each pixel in the first projection input image, the second projection input image, and the third projection input image (step S207).

First, the height information calculator 113 calculates the luminance value I (x, y) of the pixel positioned at the coordinate (x, y) in each projection input image according to the following equation (1).

[Math 1]

$$I(x,y) = 0.30 \times R(x,y) + 0.59 \times G(x,y) + 0.11 \times B(x,y) \quad (1)$$

where R, G, B are color values for RGB in each projection input image.

Subsequently, the height information calculator 113 calculates the phase value phase (x, y) of the sinusoidal pattern at the position of the coordinate (x, y) in each projection input image according to the following equation (2)

[Math 2]

$$\text{phase}(x, y) = \tan^{-1} \frac{\sqrt{3}\,(I_3(x, y) - I_1(x, y))}{2(2I_2(x, y) - I_1(x, y) - I_3(x, y))} \quad (2)$$

where $I_1$ (x, y) is the luminance value of the pixel positioned at coordinate (x, y) in the first projection input image, $I_2$ (x, y) is the luminance value of the pixel positioned at the coordinate (x, y) in the second projection input image, and $I_3$ (x, y) is the luminance value of the pixel positioned at the coordinate (x, y) in the third projection input image.

The reason why the equation (2) is derived will be described below. In the following description, $I_1$ (x, y), $I_2$ (x, y), and $I_3$ (x, y) are expressed as $I_1$, $I_2$, and $I_3$, respectively, in order to simplify the equation. When the phase value corresponding to the coordinate (x, y) in the second projection input image is $\theta$, then $I_1$, $I_2$, $I_3$ can be expressed by the following equation (3).

[Math 3]

$$I_1 = a\cos\left(\theta + \frac{2\pi}{3}\right) + b \quad (3)$$
$$I_2 = a\cos(\theta) + b$$
$$I_3 = a\cos\left(\theta - \frac{2\pi}{3}\right) + b$$

where "a" is the intensity of the projected light, and "b" is the intensity of the ambient light. Therefore, the following equation (4) is satisfied.

[Math 4]

$$I_1 - I_3 = -2a\sin(\theta)\sin\left(\frac{2\pi}{3}\right) \quad (4)$$
$$I_2 - I_1 = 2a\sin\left(\theta + \frac{\pi}{3}\right)\sin\left(\frac{\pi}{3}\right)$$
$$I_3 - I_2 = 2a\sin\left(\theta - \frac{\pi}{3}\right)\sin\left(\frac{\pi}{3}\right)$$

The following equation (5) is satisfied based on the equation (4).

[Math 5]

$$\frac{\sqrt{3}\,(I_3 - I_1)}{2(2I_2 - I_1 - I_3)} = \frac{-\sqrt{3}\,(I_1 - I_3)}{2\{(I_2 - I_1) - (I_3 - I_2)\}} \quad (5)$$
$$= \frac{\sqrt{3}\,\sin(\theta)\sin\left(\frac{2\pi}{3}\right)}{2\sin\left(\frac{\pi}{3}\right)\left(\sin\left(\theta + \frac{\pi}{3}\right) - \sin\left(\theta - \frac{\pi}{3}\right)\right)}$$
$$= \frac{\sqrt{3}\,\sin(\theta)\sin\left(\frac{2\pi}{3}\right)}{2\sin\left(\frac{\pi}{3}\right)\left(\cos(\theta)\sin\left(\frac{\pi}{3}\right)\right)}$$
$$= \tan(\theta)$$

The equation (2) is satisfied based on the equation (5).

Since the phase value calculated in the equation (2) is calculated using the arctangent function, the phase value is continuous only in the value range of $-\pi$ to $\pi$ and is discontinuous in each period of the sinusoidal pattern. Therefore, for each phase period of sinusoidal pattern, the height information calculator 113 adds $2\pi$ to the phase value of each pixel calculated by the equation (2) and performs phase connection. Hereinafter, the phase value acquired by performing phase connection is called an absolute phase value.

Subsequently, the height information calculator 113 calculates the depth for each corresponding pixel in the first projection input image, the second projection input image, and the third projection input image (step S208). The depth is the distance from the optical center of the imaging apparatus 102 to the target object illustrated in that pixel.

As described above, the pixels on the projection input image whose absolute phase values are identical correspond to the same line in the sinusoidal pattern on the projection image. Therefore, the height information calculator 113 connects the pixels on the projection input image having the same absolute phase value, and the height information calculator 113 associates a group of connected pixels with each line of the sinusoidal pattern on the projection image. Further, for each pixel included in each group, the height information calculator 113 calculates the distances from the pixels positioned at both ends of the group. The height information calculator 113 associates each pixel included in each group with each pixel on the line of the sinusoidal pattern associated with the group based on the calculated distance. Then, the height information calculator 113 calculates the depth for each pixel on the projection input image based on the positional relationship of each pixel on the projection input image with the associated pixel on the projection image.

Figure 8:
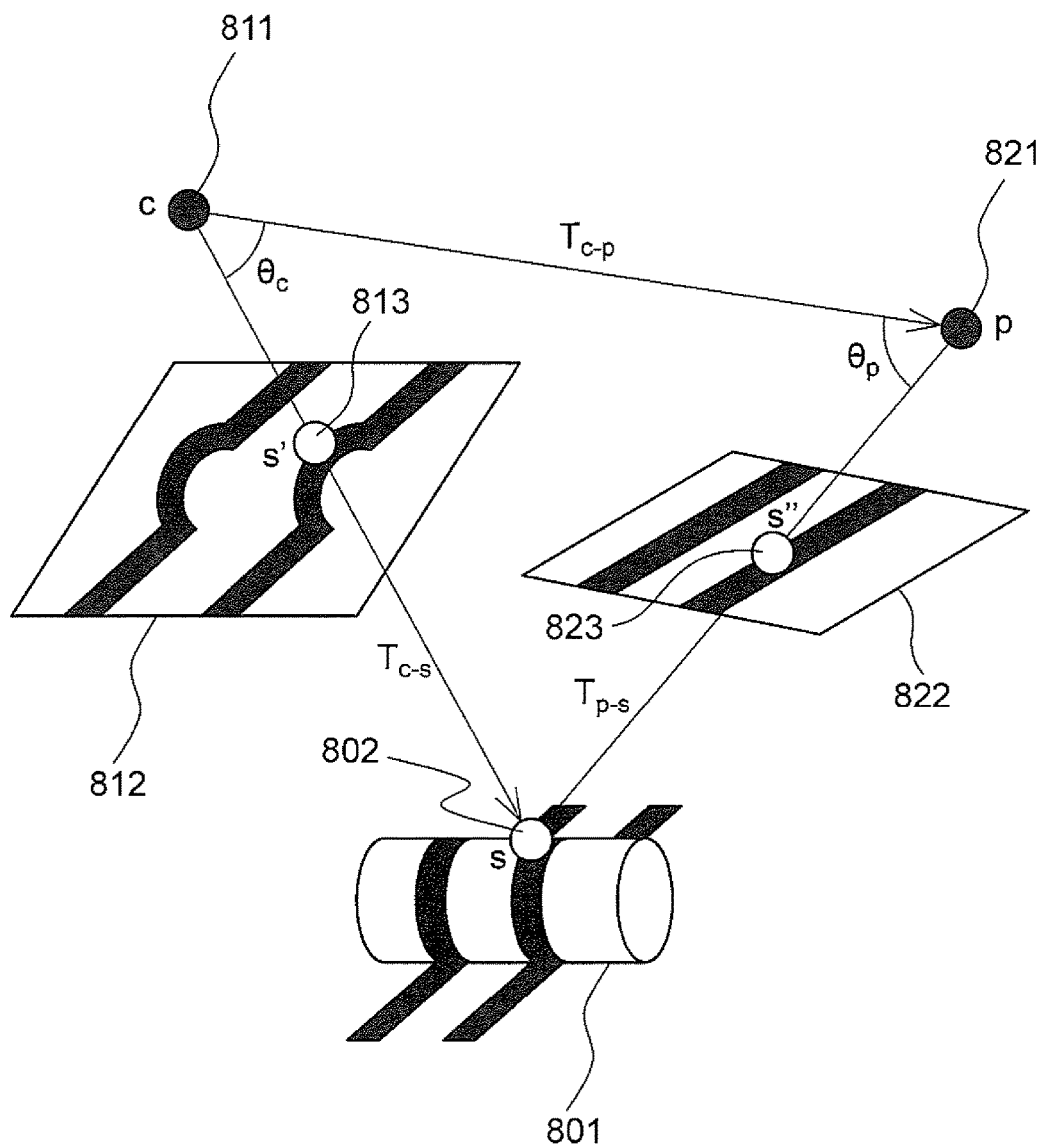
FIG. 8 is a schematic diagram for explaining a calculation method of depth.

FIG. 8 is a schematic diagram for explaining a calculation method of depth. In FIG. 8, an object 801 is a target object, a point c 811 is the optical center of the imaging apparatus 102, a plane 812 is an imaging plane of the projection apparatus 202, a point p 821 is an optical center of the projection apparatus 202, and a plane 822 is a projection plane of the projection apparatus 202. A point s' 813 on the imaging plane 812 and a point s'' 823 on the projection plane 822 correspond to a point s 802 on the target object 801 and are associated with each other. As described above, in the image processing system 1, the positional relationship between the optical center of the imaging apparatus 102 and the optical center of the projection apparatus 202 is kept constant. A vector $T_{c-p}$ pointing from the point c 811 of the optical center of the imaging apparatus 102 to the point p 821 of the optical center of the projection apparatus 202 is stored in the first storage apparatus 105 in advance.

An angle $\theta_c$ formed by the vector pointing from the point c 811 to the point p 821 and the vector pointing from the point c 821 to the point s 802 on the target object 801 is calculated according to the following equation (6) from the relationship of the inner product.

[Math 6]

$$\theta_c = \cos^{-1}\left(\frac{T_{c-s'} \cdot T_{c-p}}{|T_{c-s'}||T_{c-p}|}\right) \quad (6)$$

where $T_{c-s'}$ is a vector pointing from the point c 811 of the optical center of the imaging apparatus 102 and the point s' 813 on the imaging plane 812.

Similarly, an angle $\theta_p$ formed by a vector pointing from the point c 811 to the point p 821 and a vector pointing from the point p 821 to the point s 802 is calculated according to the following equation (7).

[Math 7]

$$\theta_p = \cos^{-1}\left(\frac{-T_{p-s''} \cdot T_{c-p}}{|T_{p-s''}||T_{c-p}|}\right) \quad (7)$$

where $T_{p-s''}$ is a vector pointing from the point p 821 of the optical center of the projection apparatus 202 to the point s'' 823 on the projection plane 822.

The depth of the point s' 813 on the imaging plane 812 is expressed by the absolute value of the vector $T_{c-s}$ pointing from the point c 821 of the optical center of the imaging apparatus 102 to the point p 811 of the optical center of the projection apparatus 202. This depth is calculated according to the following equation (8) by applying the triangulation principle to a triangle having the point c, the point p, and the point s as vertexes.

[Math 8]

$$\text{depth} = |T_{c-s}| = \frac{|T_{c-p}|\sin\theta_p}{\sin(\pi - \theta_c - \theta_p)} \quad (8)$$

Subsequently, the height information calculator 113 calculates the height information of each pixel in the first projection input image, the second projection input image, and the third projection input image based on the calculated depth (step S209).

The height information calculator 113 calculates the distance from the optical center of the imaging apparatus 102 to the point s 802 on the target object 801 in a direction orthogonal to placing plane based on the depth of the point s' 813 on the imaging plane 812 and the angle in the imaging direction of the imaging apparatus 102 with respect to the placing plane of the platen table 300. Based on the calculated distance and the distance from the optical center of the imaging apparatus 102 to the placing plane of the platen table 300, the height information calculator 113 calculates the height from placing plane to the point s 802 on the target object 801. Then, the height information calculator 113 stores the height from the calculated placing plane to the first storage apparatus 105 as the height information of the pixel corresponding to the point s' 813 on the imaging plane 812.

As described above, the height information calculator 113 calculates the height information of each pixel using the first projection input image, the second projection input image, and the third projection input image.

Figure 9:
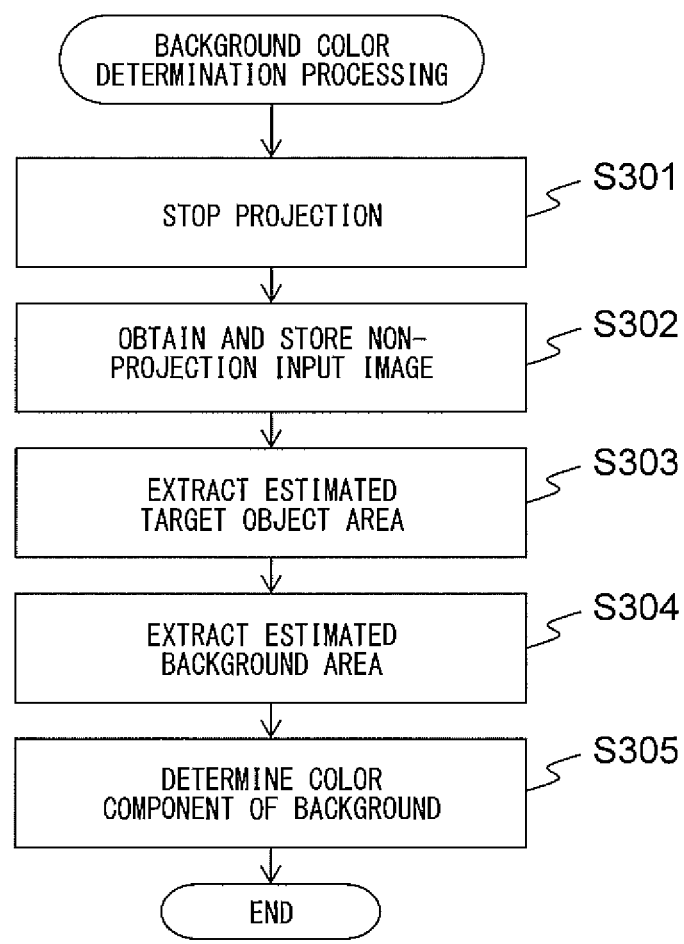
FIG. 9 is a flowchart illustrating an example of operation of height information calculation processing.

FIG. 9 is a flowchart illustrating an example of operation of height information calculation processing. The flow of the operation illustrated in FIG. 9 is executed in step S102 of the flowchart illustrated in FIG. 5.

First, the projection control module 111 transmits a stop request signal for requesting to stop the projection of projection image to the projector 200 via the first communication circuit 101 (step S301).

Upon receiving the stop request signal via the second communication circuit 201, the second CPU 210 of the projector 200 causes the projection apparatus 202 to stop the projection of the projection image.

Subsequently, the imaging apparatus 102 generates a non-projection input image acquired by imaging the target object on which no projection image is projected, and outputs the non-projection input image to the first CPU 110. The input image obtaining module 112 obtains a non-projection input image and stores the non-projection input image in the first storage apparatus 105 (step S302).

Subsequently, based on the height information of each pixel calculated by the height information calculator 113, the estimated background area extractor 114 extracts the estimated target object area where it is estimated that the target object is illustrated from the non-projection input image (step S303).

The estimated background area extractor 114 determines, for each pixel in the non-projection input image, whether or not the height indicated by the height information of the pixel corresponding to each pixel is more than a predetermined value. The predetermined value is, for example, zero. In consideration of the influence of the noise or the error in calculation of the height information, the predetermined value may be a value more than 0 (value corresponding to 1 mm, for example). The estimated background area extractor 114 extracts pixels whose height indicated by the height information exceeds the predetermined value as candidates of the pixel in which the target object is illustrated. The estimated background area extractor 114 groups the extracted pixels by labeling, and extracts the extracted pixels as the estimated target object area.

Subsequently, the estimated background area extractor 114 extracts from the non-projected input image the estimated background area in which it is estimated that the background is illustrated based on the extracted estimated target area (step S304).

The estimated background area extractor 114 extracts a circumscribed rectangle including all the extracted estimated target object areas, and extracts a rectangle with a predetermined length margin at the outside of the extracted circumscribed rectangle. The estimated background area extractor 114 extracts a band-like area having a predetermined width (for example, 5 pixels) surrounding the extracted rectangle, and adjacent to the rectangle as the estimated background area.

It should be noted that the estimated background area extractor 114 may extract a band-like area immediately adjacent to the extracted circumscribed rectangle as the estimated background area. Alternatively, the estimated background area extractor 114 may extract only the areas at the four corners of the band-like area surrounding the extracted rectangle as the estimated background area.

Figure 10:
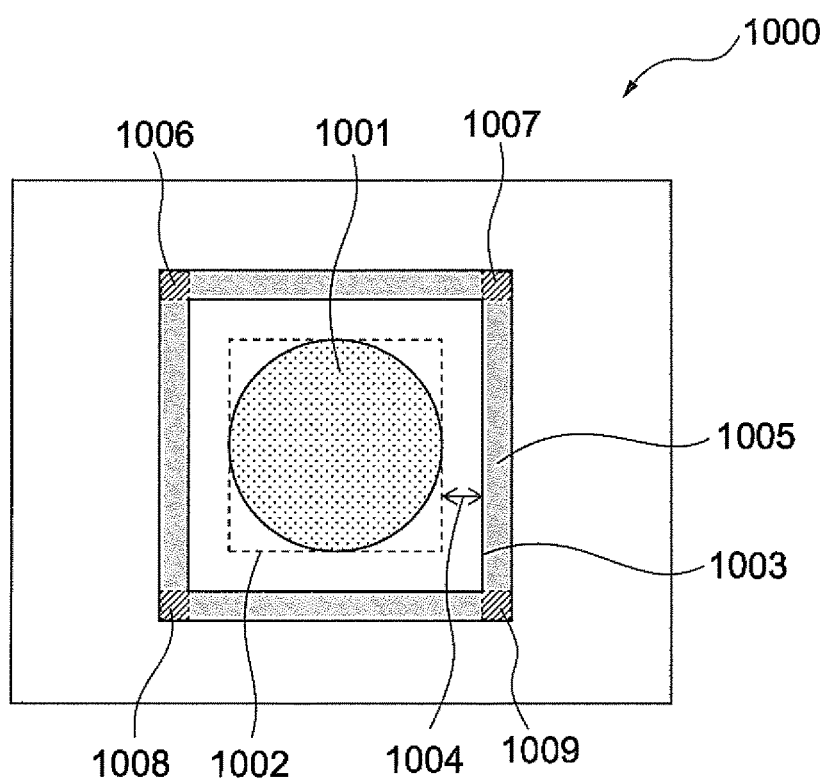
FIG. 10 is a schematic diagram for explaining an estimated background area.

FIG. 10 is a schematic diagram for explaining an estimated background area. An image 1000 illustrated in FIG. 10 is an example of a non-projection input image. In the non-projection input image 1000 as illustrated in FIG. 10, an area 1001 is an estimated target object area, a rectangle 1002 is a circumscribed rectangle of the estimated target object area 1001, and a rectangle 1003 is a rectangle having a margin 1004 for the rectangle 1002. The band-like area 1005 is the estimated background area. The areas 1006 to 1009 at the four corners of the band-like area may be the estimated background area.

Subsequently, the color component extractor 115 determines the color component of the background in the non-projection input image based on the pixel in the estimated background area (step S305), and terminates the series of steps.

The color component extractor 115 calculates the average value of the color values of the RGB colors for each pixel in the estimated background area, and the color component extractor 115 determines each of the calculated average values as the color component of the background.

The user who captures the image of the target object pays attention so as not to cast the light directly on the vicinity of the target object so that the vicinity of the target object is not affected by the lighting, but the user tends not to pay such attention to an area away from the target object. On the other hand, instead of adopting the entire area outside of the estimated target object area as the estimated background area, the estimated background area extractor 114 adopts only the area in proximity to the estimated target object area as the estimated background area. Accordingly, the color component extractor 115 can accurately calculate the color component of the background from the area not affected by disturbance such as illumination. Since the color component extractor 115 does not calculate the background color component from the entire area outside the target object candidate area, the processing load related to the color component calculation can be reduced. Further, the color component extractor 115 further reduces the processing load related to the color component calculation by setting only the areas at the four corners of the band-like area as the estimated background area.

Figure 11:
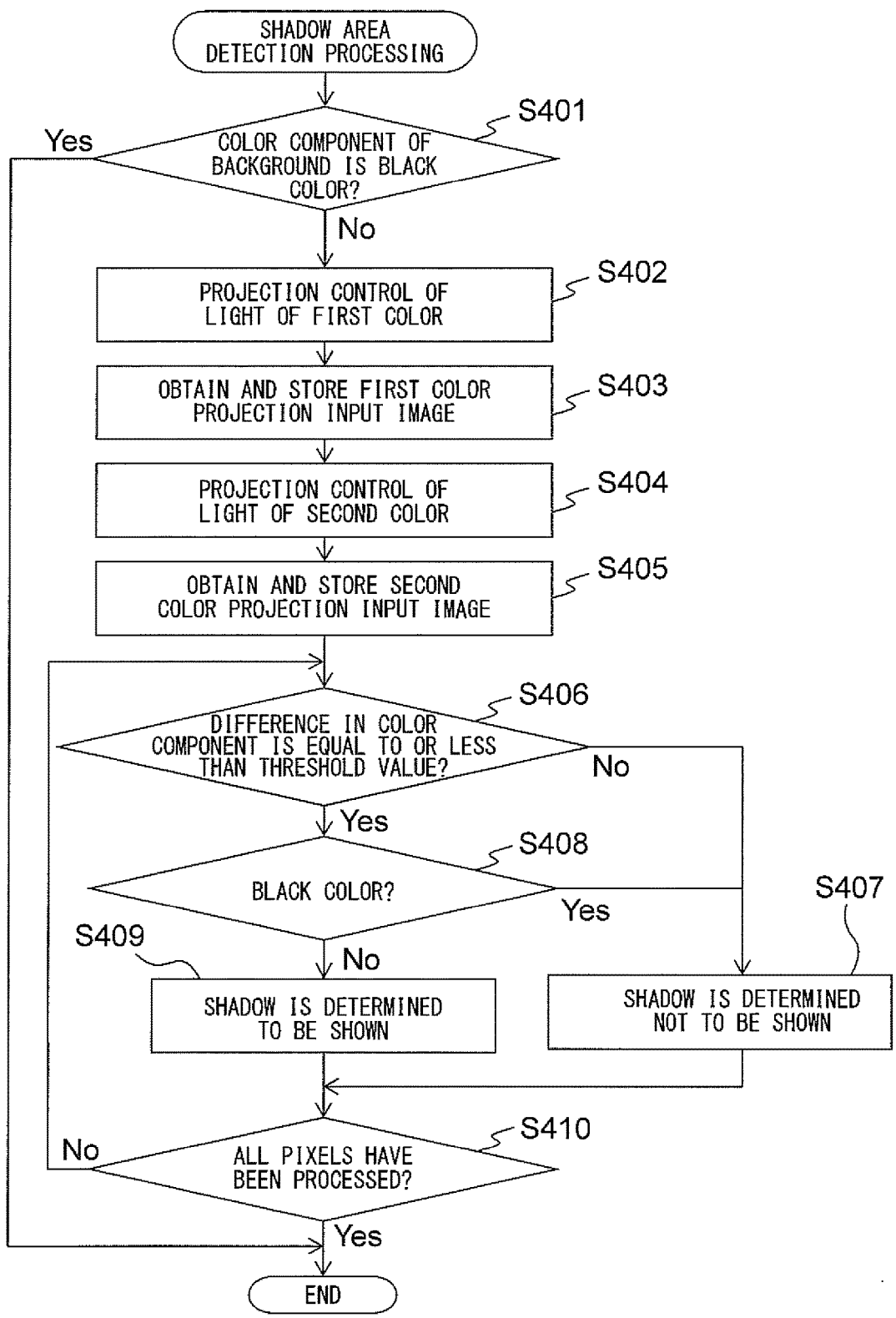
FIG. 11 is a flowchart illustrating an example of operation of shadow area detection processing.

FIG. 11 is a flowchart illustrating an example of operation of shadow area detection processing. The flow of the operation illustrated in FIG. 11 is executed in step S103 of the flowchart illustrated in FIG. 5.

First, the shadow area detector 116 determines whether or not the color component of the background determined by the color component extractor 115 is black color (step S401).

The black color means color in the range of absorbing light. The shadow area detector 116 determines that the color component of the background is black color when each color value of RGB determined as the color component of the background is 32 or less, and the shadow area detector 116 determines that the color component of the background is not black color, when any color value is more than 32.

When the shadow area detector 116 determines that the color component of the background is black color, the shadow area detector 116 determines that the background is not affected by the shadow, and terminates the series of steps without detecting the shadow area.

On the other hand, when the shadow area detector 116 determines that the color component of the background is not black color, the projection control module 111 transmits a first color request signal for requesting projection of the light of the first color toward the target object to the projector 200 via the first communication circuit 101 (step S402). The first color is, for example, green color.

Upon receiving the first color request signal via the second communication circuit 201, the second CPU 210 of the projector 200 causes the projection apparatus 202 to project the light of the first color toward the target object.

Subsequently, the imaging apparatus 102 generates a first color input image acquired by imaging the target object on which the light of the first color is projected, and outputs the first color input image to the first CPU 110. The input image obtaining module 112 obtains the first color input image and stores the first color input image in the first storage apparatus 105 (step S403).

Figure 12A:
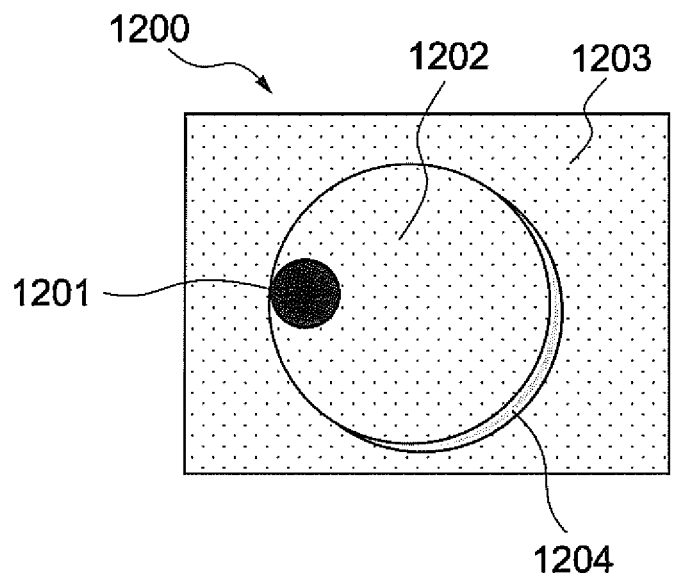
FIG. 12A is a schematic diagram for explaining a first color input image.

FIG. 12A is a schematic diagram for explaining the first color input image. An image 1200 illustrated in FIG. 12A is an example of a first color input image. The first color input image 1200 illustrated in FIG. 12A is an image acquired by imaging a target object 1202 having a black color pattern 1201. As illustrated in FIG. 12A, the target object 1202 and background 1203 have a tone of the first color, but the black color pattern 1201 absorbs light of the first color and does not have a tone of the first color. A shadow 1204 is generated around the target object 1202 due to light of the first color. The shadow 1204 does not have a tone of the first color and is a gray color lighter than the black color due to natural light or ambient light.

Subsequently, the projection control module 111 transmits a second color request signal for requesting the projection of light of the second color toward the target object to the projector 200 via the first communication circuit 101 (step S404). The second color is a color different from first color, for example pink color.

Upon receiving the second color request signal via the second communication circuit 201, the second CPU 210 of the projector 200 causes the projection apparatus 202 to project light of the second color toward the target object.

Subsequently, the imaging apparatus 102 generates a second color input image acquired by imaging the target object on which light of the second color is projected, and outputs the second color input image to the first CPU 110. The input image obtaining module 112 obtains the second color input image and stores the second color input image in the first storage apparatus 105 (step S405).

Figure 12B:
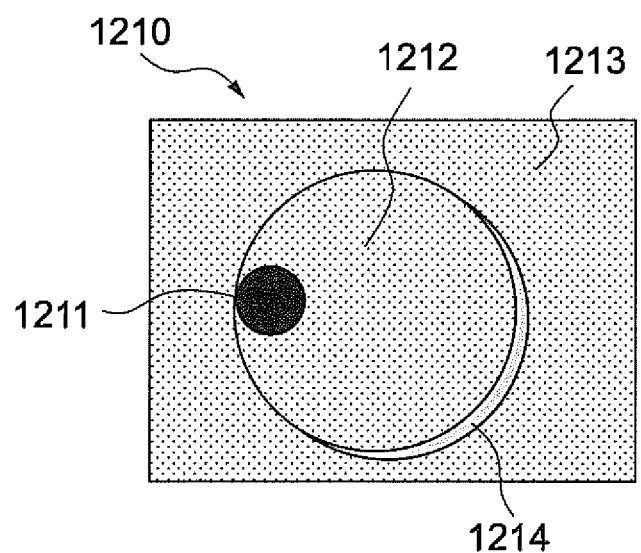
FIG. 12B is a schematic diagram for explaining a second color input image.

FIG. 12B is a schematic diagram for explaining the second color input image. An image 1210 illustrated in FIG. 12B is an example of the second color input image. The second color input image 1210 illustrated in FIG. 12B is an image acquired by imaging the same target object 1212 as the target object 1202 illustrated in FIG. 12A. As illustrated in FIG. 12B, the target object 1212 and background 1213 have the tone of the second color, but the pattern 1211 of the black color absorbs the light of the second color and does not have the tone of the second color. The shadow 1214 is generated by the light of the second color around the target object 1212. The shadow 1214 does not have the second color and is a gray color lighter than black color due to natural light or ambient light just like the shadow 1204 illustrated in FIG. 12A.

The processing in the following steps S406 to S410 is executed for each of the pixel combinations existing in the corresponding positions in the first color input image and the second color input image.

First, the shadow area detector 116 determines whether or not the difference in the color component between the pixel in the first color input image and the pixel in the second color input image corresponding to that pixel is equal to or less than a threshold value (step S406). The shadow area detector 116 calculates the difference between the color values of two pixels for each color of RGB and calculates the sum of the calculated differences as a difference of the color component. The threshold value is set to, for example, a color difference (for example, 20) with which a person can visually discriminate the difference in color on the image.

When the difference in the color component of each pixel is larger than a threshold value, the shadow area detector 116 determines that each pixel has a first color tone and a second tone, and that the shadow is not illustrated in that pixel (Step S407).

On the other hand, when the difference in the color component of each pixel is equal to or less than the threshold value, the shadow area detector 116 determines whether or not the color component of each pixel in the first color input image and the second color input image is black color (step S408). The shadow area detector 116 determines whether or not the color component of each pixel is black color just like step S401.

When the color component of any pixel is black color, the shadow area detector 116 determines that the target object or the background of the black color is illustrated in the pixel, and that the shadow is not illustrated in the pixel (step S407).

On the other hand, when the color components of both pixels are not the black color, the shadow area detector 116 determines that the pixels have gray color, and that a shadow is illustrated in that pixel. Then, the shadow area detector 116 detects the position in each of the projection input image and the non-projection input image corresponding to the position of the pixel as a shadow area (step S409).

Subsequently, the shadow area detector 116 determines whether or not processing has been executed for all the pixel combinations existing at the corresponding positions in the first color input image and the second color input image (step S410). When the shadow area detector 116 determines that there are pixel combinations for which the processing has not yet been executed, the processing returns back to step S406 to repeat the processing in step S406 to S410. The shadow area detector 116 terminates the series of steps when the processing is executed for all pixel combinations.

As described above, the shadow area detector 116 detects, as the shadow area, the position in each of the projection input image and the non-projection input image corresponding to the positions of the pixel combinations in which the difference in the color components of the pixels is equal to or less than the threshold value and the pixel is not the black color.

FIG. 13 is a flowchart illustrating an example of operation of target object area detection processing. The flow of the operation illustrated in FIG. 13 is executed in step S104 of the flowchart illustrated in FIG. 5.

The processing in the following steps S501 to S506 is executed for each of pixel combinations existing at the corresponding positions in the first to third projection input images, the non-projection input image, and the first to second color input images.

First, the target object area detector 117 determines whether or not a shadow is determined to be illustrated in the pixel of interest in the first color input image and the second color input image by the shadow area detector 116 (step S501).

When the shadow is determined to be illustrated in the pixel of interest, the target object area detector 117 determines that the target object is not illustrated in the pixel (step S502).

On the other hand, when the shadow is determined not to be illustrated in the pixel of interest, the target object area detector 117 determines whether or not the height indicated by the height information of the pixel in the projection input image corresponding to that pixel is more than the predetermined value (step S503). The predetermined value is the same value as the predetermined value used to extract the target object candidate area. It should be noted that the predetermined value may be a value different from the predetermined value used to extract the target object candidate area.

When the height indicated by the height information of the pixel is more than the predetermined value, the target object area detector 117 determines that the target object is illustrated in the pixel (step S504).

On the other hand, when the height indicated by the height information of the pixel is equal to or less than the predetermined value, the color component extractor 115 extracts the color component of the pixel in the non-projection input image corresponding to that pixel. Then, the color component extractor 115 determines whether or not the difference between the extracted color component and the background color component is equal to or more than a predetermined value (step S505).

For each color of RGB, the color component extractor 115 calculates the difference between the extracted color value and the color value of the background, and calculates the sum of the calculated differences as the difference in the color component. The predetermined value is set to, for example, a color difference (for example, 20) with which a person can visually discriminate the difference in color on the image.

When the difference between the extracted color component and the background color component is equal to or more than the predetermined value, the target object area detector 117 determines that the target object is illustrated in the pixel (step S504).

On the other hand, when the difference between the extracted color component and the background color component is less than the predetermined value, the target object area detector 117 determines that the target object is not illustrated in the pixel (step S505).

Subsequently, the target object area detector 117 determines whether the processing has been executed for all the pixels (step S506). When there is a pixel for which the processing has not yet been executed, the target object area detector 117 returns the processing back to step S501 to repeat the processing in step S501 to S506.

On the other hand, when the processing is executed for all the pixels, the target object area detector 117 generates a mask image for identifying the area in which the target object is illustrated and the area in which the target object is not illustrated (step S507). The target object area detector 117 generates a mask image in which a pixel corresponding to a pixel determined to illustrate the target object is a valid pixel, and a pixel corresponding to a pixel determined not to illustrate the target object is a invalid pixel.

Subsequently, the target object area detector 117 groups valid pixels in the mask image by labeling (step S508).

Subsequently, the target object area detector 117 detects, as a target object area, the pixels at the positions corresponding to the positions where a group of valid pixels exists in the mask image in each of the projection input image and the non-projection input image (step S509), and terminates the series of steps.

As described above, the target object area detector 117 detects the target object area in each projection input image based on the height information of each pixel in each projection input image. As a result, as illustrated in FIG. 7A to FIG. 7D, the target object area detector 117 can detect the target object area with a high degree of accuracy even if the target object 701 has a color similar to the background.

The target object area detector 117 detects the target object area in the non-projection input image based on the color component of each pixel in the non-projection input image and the color component of the background. As a result, the target object area detector 117 can detect the target object area with a high degree of accuracy based on the color component even if the target object has a planar shape with a low height.

The target object area detector 117 detects the target object area so as not to include the shadow area detected by the shadow area detector 116. As a result, the target object area detector 117 can prevent the portion of the shadow from being included in the cropping image even if a shadow is generated due to the target object having a three-dimensional shape. Since the projection image projected from the projector 200 is not projected in the shadow area, the imager 100 cannot calculate the height information correctly. The target object area detector 117 can detect the target object area with a high degree of precision by detecting the target object area so as not to include the shadow area, without using the height information calculated in the less reliable area.

It should be noted that the processing of step S501 may be omitted. In that case, the target object area detector 117 detects the target object area based on the height information of each pixel regardless of whether the shadow is illustrated in each pixel or not. Similarly, the processing in step S503 may also be omitted. In that case, the target object area detector 117 determines that the target object is not illustrated in the pixel if the height indicated by the height information of the pixel is equal to or less than the predetermined value. The order of processing in step S503 and step S505 may be reversed. In that case, when the difference between the color component of each pixel and the color component of the background is less than the predetermined value, the target object area detector 117 detects the target object area based on the height information of the pixel. In these cases, the target object area detector 117 can accurately detect the target object.

The target object area detector 117 calculates the degree of the target object representing the likelihood that the target object is illustrated in each pixel, and the target object area detector 117 may determine whether or not the target object is illustrated in each pixel depending on whether or not the degree of likelihood of being the target object is equal to or more than a predetermined value. In that case, the target object area detector 117 calculates the degree of likelihood of being the target object, so that the degree of likelihood of being the target object is higher as the height illustrated in the height information of each pixel is higher, and the degree of likelihood of being the target object is lower as the height is lower. Further, the target object area detector 117 calculates the degree of likelihood of being the target object, so that the degree of likelihood of being the target object is higher as the difference between the color component of each pixel and the color component of the background is larger, and the degree of likelihood of being the target object is lower as the difference between the color component and the color component of the background is smaller. As a result, the target object area detector 117 can detect the target object more accurately.

Alternatively, the target object area detector 117 may generate the edge image based on the height information of each pixel and detect the target object based on the edge image. In that case, for the height indicated by the height information of each pixel in the projection input image, the target object area detector 117 calculates the absolute value (hereinafter referred to as adjacent difference value) of the difference in the height between pixels on both sides in the horizontal or vertical direction. The target object area detector 117 extracts, as an edge pixel, a pixel whose adjacent difference value in the horizontal or vertical direction is more than a threshold value, and the target object area detector 117 generates an image composed of edge pixels as an edge image. The target object area detector 117 groups the edge pixels in the generated edge image by labeling, and the target object area detector 117 detects the area surrounded by the grouped edge pixels as a target object area. In this case, the target object area detector 117 can also accurately detect the target object.

Instead of detecting the target object area based on the color component of each pixel in the non-projection input image, the target object area detector 117 may detect the target object area based on the color component of each pixel in the projection input image. In this case, the estimated background area extractor 114 extracts the estimated background area from the projection input image based on the height information of each pixel in the projection input image. Based on the pixels in the estimated background area, the color component extractor 115 determines the color component of the background in the projection input image, and extracts the color component of each pixel in the projection input image. Then, the target object area detector 117 detects the target object area based on the color component in the background and the color component of each pixel in the projection input image.

Through operation in accordance with the flowcharts illustrated in FIGS. 5, 6, 9, 11, and 13, the image processing system 1 can easily and accurately detect the target object area in the image acquired by imaging the target object. In particular, the image processing system 1 uses the height information so that the image processing system 1 can detect the target object area with a high degree of accuracy even if the color of the entire or a part of the target object and the color of the background are similar to each other. The image processing system 1 can detect the target object area without using special background equipment such as a blue back, special lighting equipment such as a backlight, etc.

REFERENCE SIGNS LIST 1 image processing system
100 imager
111 projection control module
112 input image obtaining module
113 height information calculator
114 estimated background area extractor
115 color component extractor
116 shadow area detector
117 target object area detector
118 cropping module
200 projector

What is claimed is:

1. An image processing system comprising:
a projector for projecting a projection image having a stripe pattern or a grid pattern toward a target object; and
an imager for capturing a first input image of the target object on which the projection image is projected, and a second input image of the target object on which no projection image is projected,
wherein the imager includes:
a processor for
calculating height information of the target object in the first input image by comparing the projection image with the first input image,
extracting, from the second input image, an estimated background area not including the target object, based on the height information,
determining a color component of the background area in the second input image, based on a pixel in the background area, and
detecting a target object area where the target object exists in the second input image, based on the determined color component of the background area.

2. The image processing system according to claim 1, wherein the projector further projects light of a first color and light of a second color different from the first color toward the target object, wherein
the imager further captures a first color input image of the target object on which the light of the first color is projected and a second color input image of the target object on which the light of the second color is projected, and wherein
the processor further determines, for each pixel combination existing at a corresponding position in the first color input image and the second color input image, whether or not a difference in a color component between pixels is equal to or less than a threshold value and whether or not the color component of each pixel is a black color, and detecting, as a shadow area, a position in the second input image corresponding to a position of a pixel combination of which difference in a color component between pixels is equal to or less than a threshold value and of which the color component of each pixel is not a black color, and
detects the target object area so as not to include the shadow area detected by the shadow area detector.

3. The image processing system according to claim 1, wherein the processor does not detect the shadow area when the determined color component of the background area is the black color.

4. An image processing system comprising:
a projector for projecting a projection image having a stripe pattern or a grid pattern toward a target object; and
an imager for capturing an input image of the target object, wherein the imager includes:
a processor for calculating height information of the target object in the input image by comparing the projection image with the input image and detecting a target object area where the target object exists in the input image, based on the height information, wherein
the projector further projects light of a first color and light of a second color different from the first color toward the target object, wherein
the imager further captures a first color input image of the target object on which the light of the first color is projected and a second color input image of the target object on which the light of the second color is projected, and wherein
the processor further determines, for each pixel combination existing at a corresponding position in the first color input image and the second color input image, whether or not a difference in a color component between pixels is equal to or less than a threshold value and whether or not the color component of each pixel is a black color, and detecting, as a shadow area, a position in the second input image corresponding to a position of a pixel combination of which difference in a color component between pixels is equal to or less than a threshold value and of which the color component of each pixel is not a black color, and
detects the target object area so as not to include the shadow area detected by the shadow area detector.

5. The image processing system according to claim 4, wherein the processor does not detect the shadow area when the determined color component of the background area is the black color.

6. An imager for capturing a first input image of a target object on which a projection image having a stripe pattern or a grid pattern is projected and a second input image of the target object on which no projection image is projected, the imager comprising:
a processor for calculating height information of the target object in the first input image by comparing the projection image with the first input image,
extracting, from the second input image, an estimated background area where it is estimated that a background is illustrated, based on the height information, wherein the background does not include the target object,
determining a color component of background in the second input image, based on a pixel in the estimated background area, and
detecting a target object area where the target object exists in the second input image, based on the determined color component of the background.

7. An object area detection method for an image processing system including a projector and an imager, the method comprising:
- projecting, by the projector, a projection image having a stripe pattern or a grid pattern toward a target object;
- capturing, by the imager, a first input image of the target object and a second input image of the target object on which no projection image is projected;
- calculating, by the imager, height information of the target object in the first input image by comparing the projection image with the first input image;
- extracting, by the imager, from the second input image, an estimated background area where it is estimated that a background is illustrated, based on the height information, wherein the background does not include the target object;
- determining, by the imager, a color component of background in the second input image, based on a pixel in the estimated background area; and
- detecting, by the imager, a target object area where the target object exists in the second input image, based on the determined color component of the background.

8. A computer-readable, non-transitory medium storing computer program, wherein the computer program causes an imager for capturing a first input image of a target object on which a projection image having a stripe pattern or a grid pattern is projected by a projector and a second input image of the target object on which no projection image is projected to execute a process, the process comprising:
- calculating height information of the target object in the first input image by comparing the projection image with the first input image;
- extracting, from the second input image, an estimated background area where it is estimated that a background is illustrated, based on the height information, wherein the background does not include the target object;
- determining a color component of background in the second input image, based on a pixel in the estimated background area; and
- detecting a target object area where the target object exists in the second input image, based on the determined color component of the background.

* * * * *